(12) United States Patent
Yu et al.

(10) Patent No.: US 7,538,454 B2
(45) Date of Patent: May 26, 2009

(54) LEAKAGE CURRENT SHUNT IN AN ELECTRICAL POWER DISTRIBUTION SYSTEM UTILIZING SOLID STATE RELAYS

(75) Inventors: Wenjiang Yu, Mississauga (CA); Zhenning Z. Liu, Mississauga (CA); Daniel G. Filimon, Richmondhill (CA); Boris Plivcic, Oakville (CA)

(73) Assignee: Honeywell International Inc., Morristown, NJ (US)

( * ) Notice: Subject to any disclaimer, the term of this patent is extended or adjusted under 35 U.S.C. 154(b) by 415 days.

(21) Appl. No.: 11/475,103

(22) Filed: Jun. 27, 2006

(65) Prior Publication Data

US 2008/0197699 A1    Aug. 21, 2008

Related U.S. Application Data

(60) Provisional application No. 60/695,002, filed on Jun. 30, 2005.

(51) Int. Cl.
*H01H 79/00* (2006.01)
*H01H 3/26* (2006.01)

(52) U.S. Cl. .................................. 307/100; 307/140
(58) Field of Classification Search ............... 307/140, 307/100
See application file for complete search history.

(56) References Cited

U.S. PATENT DOCUMENTS

| | | | |
|---|---|---|---|
| 3,873,905 A | 3/1975 | Marek | |
| 4,618,906 A | 10/1986 | Paice et al. | |
| 4,626,954 A | 12/1986 | Damiano et al. | |
| 4,656,365 A * | 4/1987 | Billings | 307/140 |
| 5,222,492 A * | 6/1993 | Morgan et al. | 607/5 |
| 6,229,405 B1 | 5/2001 | Hashimoto | |
| 6,891,705 B2 | 5/2005 | Bryan | |
| 2005/0110349 A1 | 5/2005 | Bertrand | |

FOREIGN PATENT DOCUMENTS

GB    2 178 255 A    2/1987

OTHER PUBLICATIONS

Methods of measurement of touch current and protective conductor current, IEC 60990, Edition 2.1b, Aug. 31, 1999.

\* cited by examiner

*Primary Examiner*—Ronald W Leja
(74) *Attorney, Agent, or Firm*—Oral Calgar, Esq.

(57) ABSTRACT

The invention provides an apparatus for shunting leakage current of a solid state switching device (SSSD) (10). The apparatus selectively provides a shunt pathway to divert current away from the output load based on the switching state of the SSSD. The apparatus may include a shunt impedance component (14) connected to the SSSD, and a switching element (16) for selectively connecting the other end of the shunt impedance component to ground based on the switching state of the SSSD. Accordingly, when the SSSD is turned off, the switching element is switched to a state that connects the shunt impedance component to ground, thereby shunting leakage current.

13 Claims, 11 Drawing Sheets

LEAKAGE CURRENT SHUNT IN AN ELECTRICAL POWER DISTRIBUTION SYSTEM UTILIZING SOLID STATE RELAYS

CROSS-REFERENCES TO RELATED APPLICATIONS

This non-provisional application claims priority under 35 U.S.C. § 119(e) on U.S. Provisional Application No. 60/695,002 filed on Jun. 30, 2005, the entire contents of which are hereby incorporated by reference.

FIELD OF THE INVENTION

The present invention relates to electrical power distribution, and more particularly to aspects of an electrical power distribution system that utilizes solid state switching devices as relays and/or circuit breakers to supply electrical loads.

BACKGROUND OF THE INVENTION

When solid state switching devices (SSSDs) (e.g., MOSFETs) are used instead of conventional electromechanical relays or circuit breakers for AC high power applications, excessive leakage current can occur when the device is in an OFF state, thereby creating a safety issue. As one example, in an aircraft secondary electrical power distribution system (SEPDS), maintenance personnel may come into contact with the open end at the output of an SSSD and get startled when replacing an aircraft load.

While the Solid State Relay is becoming an alternative to the conventional electromechanical relay in both low power and high power applications due to the advantages of light weight, lack of maintenance required, and small size, leakage current of the SSSD in an OFF state due to its junction capacitance can raise safety concerns in some high power applications. As implemented in aircraft applications, the Solid State Relay is used to control the electrical loads, such as lighting and entertainment devices. In a maintenance mode of such an implementation, the operator may be exposed to the conductor contact during the maintenance tasks, such as changing a bulb, at the time when the Solid State Relay is supposed to be OFF. In this case, if the leakage current exceeds a certain level, the operator's safety might be at risk.

Aspects of the present invention address these safety issues when SSSDs are used as relays and/or circuit breakers in electrical power distribution systems.

SUMMARY OF THE INVENTION

The present invention provides an apparatus for shunting leakage current in an electrical power distribution system utilizing a solid state switching device (SSSD). The apparatus includes a switchable shunt that selectively provides a pathway to divert leakage current away from the output load based on the switching state of the SSSD.

In an exemplary embodiment, the apparatus includes a shunt impedance component connected to an output of the SSSD, and a shunt switching element for selectively connecting the other end of the shunt impedance component to ground based on the power switching state of the SSSD. Thus, the shunt switching element operates to provide the leakage shunt when the SSSD is turned off, and remove the shunt when the SSSD is turned on.

The apparatus may be designed to prevent leakage current from rising above levels endangering the safety of operators. Also, the apparatus may be designed to withstand potential fault conditions related to a particular implementation, such as the secondary electrical power distribution system (SEPDS) of an aircraft.

DETAILED DESCRIPTION

Figure 1:
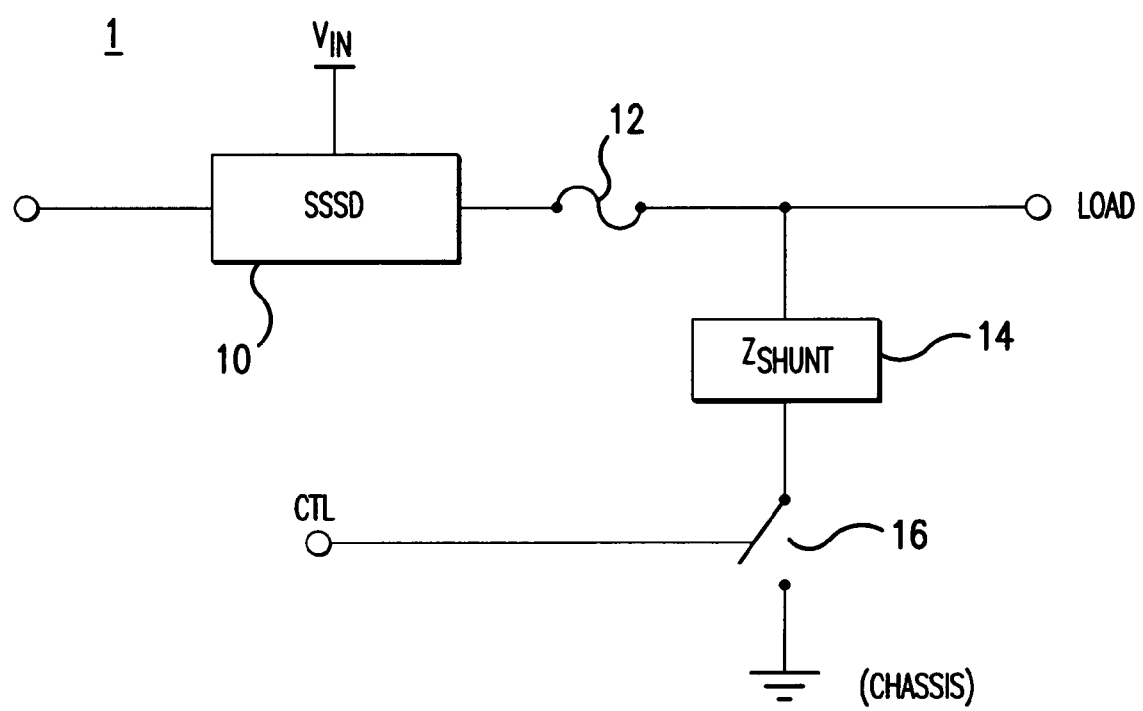
FIG. 1 illustrates shunt circuitry for use in an electrical power distribution system utilizing a solid state switching device (SSSD), according to an exemplary embodiment of the present invention.

In one aspect, embodiments of the present invention relate to an apparatus and a method for shunting leakage current in an electrical power distribution system that uses solid state switching devices as relays and/or circuit breakers. With this leakage current shunting scheme, embodiments of the present invention addresses safety issues that may arise in such electrical power distribution systems. Although embodiments of the present invention are discussed below in which power MOSFETs are used as solid state switching devices (SSSDs) (also referred to as solid state relays) in an electrical power distribution system, aspects of the present invention are applicable to systems using other types of solid state switching devices. Furthermore, although aspects of the present invention are described in the context of a specific application example, it should be recognized that principles of the present invention are applicable to other implementations and environments.

Safety Considerations

Assessing the safety risk of leakage current depends on the model of the leakage current source and the statistical model of the human body. When assessing leakage current from a power MOSFET, the model of the leakage current source varies upon the source type of the power MOSFET input and the nature of the power MOSFET itself, which may be manufactured with various technologies. To cover all types of combinations of power source and power MOSFET devices, a current source can be used as a universal model of the worst case.

The statistical model of the human body is discussed in "Method of Measurement of Touch Current and Protective Conductor Current," IEC 60990, Edition 2.1b (Aug. 31, 1999), (hereafter "IEC 60990"), the contents of which is herein incorporated by reference in its entirety. IEC 60990 specifies three types of the measurement network corresponding to four different levels of electrical hazard in terms of physiological response. Four levels of response in order of increasing current are:

1) Perception—the threshold of perception, which may be as low as several microamperes.
2) Reaction—the level as which the passage of current is perceived as unpleasant, leading the subject to pull away, or "react". This is considered to be in vicinity of 0.5 mA for low frequencies. The threshold rises with frequency because of the decreasing sensitivity of the nervous system.
3) Let-go—the level of current at which a shocked person loses the ability to let go of the electrical source due to disruption of nerve function. An average level of 10 mA is assumed, with an increasing level at higher frequencies.
4) Electric burn—the level at which skin or organs become damaged. Electric burn is sensitive to current flow, but not to frequency. The electric burn threshold is reported to begin at current densities of 300 to 400 mA/cm$^2$.

As described above, at the reaction level, an operator who is exposed to the leakage current starts reacting. This leakage current level does not itself injure the operator; however if a tool falls from the operator's hands due to reaction, it may cause injury or damage to surrounding persons or things. Therefore, this level may be considered as a suitable threshold for leakage current.

Thus, according to an exemplary embodiment of the present invention, the shunt circuitry of an electrical power distribution system is designed to limit the leakage current to a level of approximately 0.5 mA.

Application-Specific Considerations

Other exemplary embodiments of the present invention are particularly suitable for shunting an SSSD in a secondary electrical power distribution system (SEPDS) of an aircraft. According to these embodiments, the design of the shunt circuitry takes into consideration several situations that are specific to aircraft applications.

For example, the shunt circuitry may be designed to survive potential fault connections between two loads, one of which is switched ON while the other one is OFF. This means that the shunt resistance is designed to withstand the application of 115 V (assuming a 115 V power distribution environment).

Another aircraft-specific consideration is to implement shunt circuitry capable of surviving a 1600 V lightning bolt.

Also, if 115 V is applied continuously to the shunt resistance, this generates significant thermal dissipation. Thus, it would be advantageous to switch the shunt resistance ON when the solid state relay is OFF, and vice versa.

Exemplary Embodiments of Leakage Current Shunt Circuitry

FIG. 1 illustrates a circuit arrangement 1 employing leakage shunt circuitry for use in an electrical power distribution system with solid state relays (i.e., SSSDs) in accordance with an embodiment of the present invention. As shown in FIG. 1, the circuit arrangement 1 includes an SSSD 10, which receives $V_{IN}$ as an electrical power input to be selectively distributed to an output load(s); a fuse 12 (optional) on the output side of the SSSD 10; a shunt impedance component 14; and a shunt switching element 16. According to an exemplary embodiment, circuit arrangement 1 may be implemented in a particular channel of a solid state power controller (SSPC).

It should be noted that the implementation of the fuse 12 is merely to comply with design parameters of the SEPDS of various types of aircraft. As such, the inclusion of the fuse 12 is optional based on design parameters of the electrical power distribution system. For example, in other non-aircraft applications, such a fuse 12 may be omitted.

The operation of the shunt circuitry in FIG. 1 will now be described. The SSSD 10 is controlled to selectively switch power on and off for the output load. Such control may be executed via signals from a control device (not shown), e.g., microcontroller, application specific integrated circuit (ASIC), or general purpose computer. For instance, the control device (not shown) may turn the SSSD on in order to distribute electrical power to the load, and turn the SSSD 10 OFF to cut power off from the load.

Similarly, the shunt switching element 16 is turned on and off to selectively provide a shunt pathway to divert leakage current from the output load. As shown in FIG. 1, a control signal CTL is applied to cause the shunt switching element 16 to selectively turn on or off.

Specifically, when the shunt switching element 16 is turned on, it connects the shunt impedance component 14 (with impedance value of $Z_{SHUNT}$) to ground. When the shunt switching element 16 is turned off to disconnect shunt impedance component 14 from ground. For example, when the shunt circuitry 1 is implemented in aircraft SEPDS, the electrical ground of the circuit may be a chassis, as illustrated in the figures.

In an exemplary embodiment, the shunt switching element 16 is controlled according to the power switching function presently performed by the SSSD 10. Thus, the status of the CTL signal is dependent on the operative state of SSSD 10. Since leakage current is a concern only when the SSSD 10 is turned off (and power is switched off for the load), it is only necessary to divert such leakage current away from the load when the SSSD 10 is turned off.

Accordingly, the shunt switching element 16 is turned on (and connect shunt impedance component 14 to ground), when the SSSD 10 is turned off. This provides a shunt pathway for diverting leakage current away from the output load. Conversely, when the SSSD 10 is turned on, the shunt switching element 16 is turned off, thereby disconnecting the shunt impedance component 14 from ground.

Similar to the SSSD 10, control of the shunt switching element 16 may be performed by a control device (not shown), such as a microcontroller, ASIC, or general purpose computer. As will be discussed below in connection with FIG. 6, both the SSSD 10 and the shunt switching element 16 may be controlled by the same control device. However, in an alternative embodiment (also described below in connection with FIG. 6), the shunt switching element 16 may be controlled in accordance with a control device that senses the switching state of the SSSD 10, as will be discussed below in connection with FIG. 4B.

Next, a description will be provided for specific embodiments utilizing the principles described above in connection with FIG. 1.

In a particular embodiment, the SSSD 10 may be a power MOSFET 310, as illustrated in the circuit arrangement 300A 300B, 600A, and 600B of FIGS. 4A, 4B, 7A, and 7B, respectively. A MOSFET is a common type of SSSD utilized in solid state power controllers (SSPCs). However, other types of solid state relays may be used, according to design requirements and preferences for the electrical power distribution system.

Figure 7A:
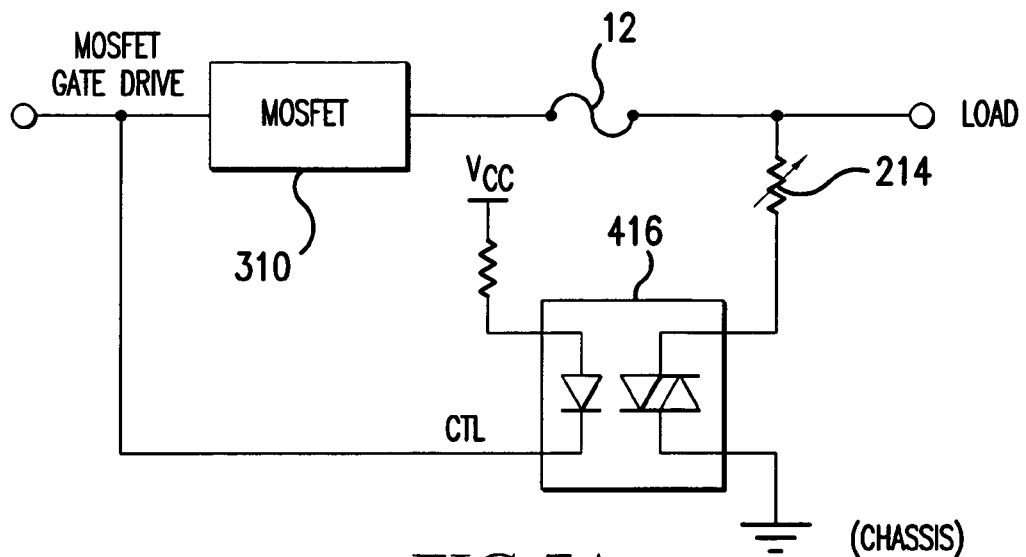
FIGS. 7A and 7B illustrate alternative configurations of shunt circuitry utilizing a power MOSFET, PTC device, and opto-triac, according to exemplary embodiments of the present invention.
Figure 7B:
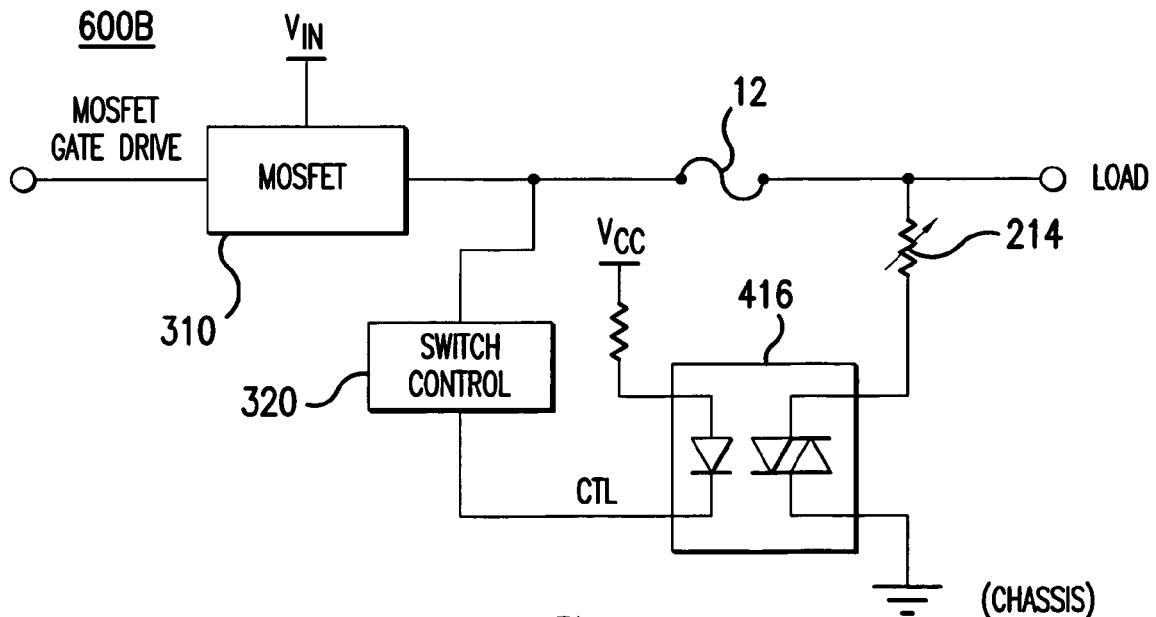

In an exemplary embodiment, the shunt switching element 16 may comprise an opto-triac. This embodiment is particularly suited to AC power applications. A generic embodiment in which an opto-triac 416 is employed as the shunt-switching element is illustrated in circuit arrangement 400 of FIG. 5 (while specific implementations are shown in FIGS. 7A and 7B). An exemplary type of opto-triac 418 is the SIEMENS Triac-Driver Optocoupler IL4218-X009, with specifications of: continuous output current=300 mA; transient output current=3 A; and withstand voltage of 800 V. The transient current and withstand voltage of the IL4218-X009 makes it suitable for aircraft applications in which it might have to withstand the occurrence of lightning as the maximum transient voltage. Of course, other types of shunt switching elements 16 may be used, as will be contemplated by those of ordinary skill in the art, depending on design parameters and application. For instance, it is contemplated that an optical transistor might also be used, as well as other types of switches and relays, which are electrically isolated from the SSSD 10.

Figure 2A:
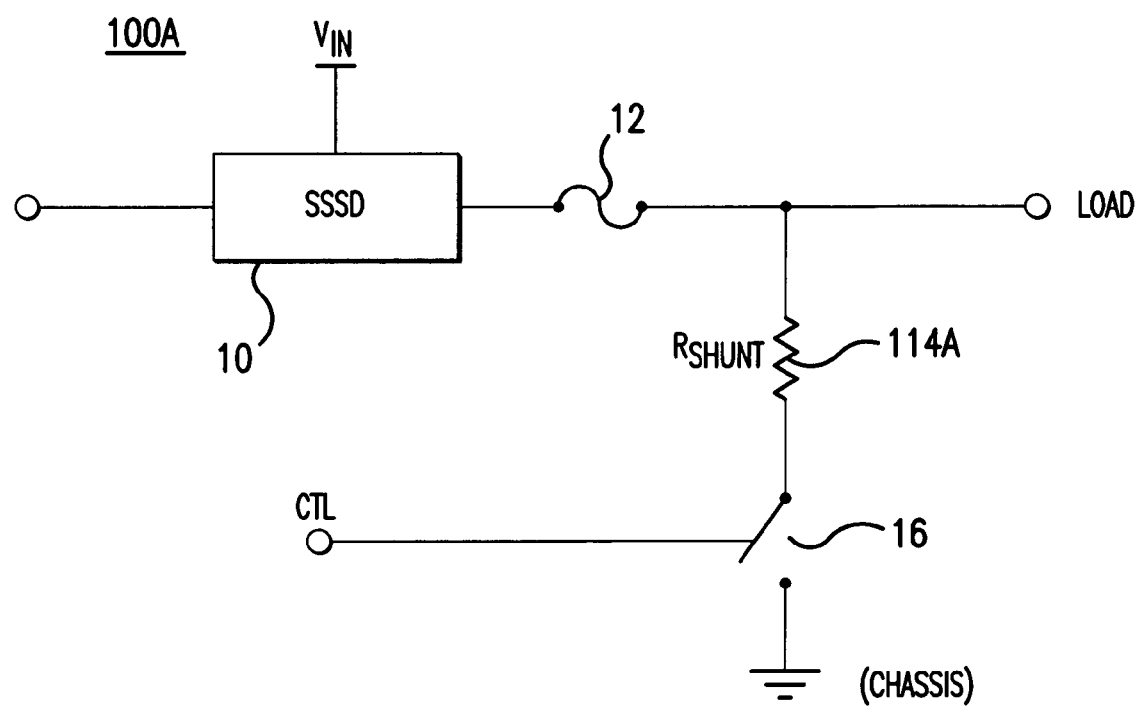
FIGS. 2A and 2B illustrate the use of a common resistor and capacitor as shunt impedance components, according to an exemplary embodiment of the present invention.
Figure 2B:
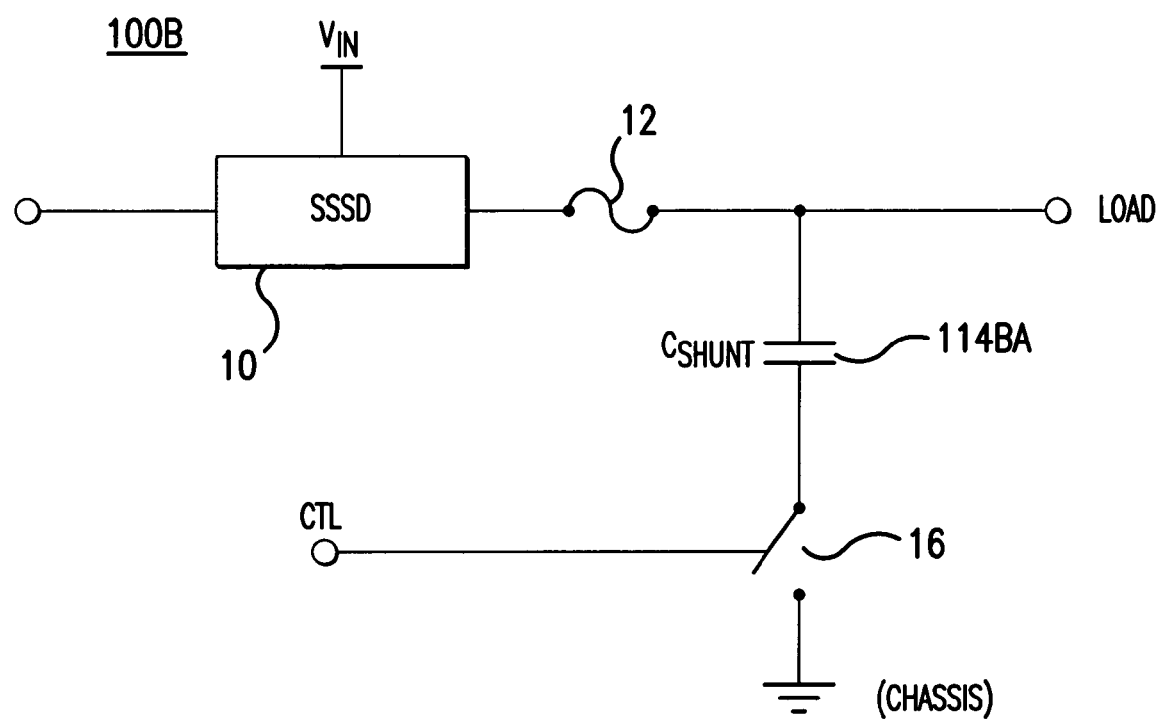

According to an exemplary embodiment, the shunt impedance component 14 may be specifically implemented as a common resistor 114A ($R_{SHUNT}$) or capacitor 114B ($C_{SHUNT}$), as shown in the circuit arrangements 100A and 100B of FIGS. 2A and 2B, respectively. In view of the safety considerations described above, the impedance value of $Z_{SHUNT}$ is specifically designed to limit the leakage current flowing to the output load to a level of no more than 0.5 mA when the SSSD 10 is turned on.

However, in an alternative embodiment, the shunt impedance component 14 may be specifically implemented as a positive thermal coefficient (PTC) device 214. This is illustrated in the circuit arrangement 200 of FIG. 3A. The nominal resistance of the PTC device 214 (and, thus, $Z_{SHUNT}$) may be set to an appropriate value for limiting the leakage current to no more than 0.5 mA.

An exemplary type of PTC device 214 is the ceramic PTC YM12045X301, with specifications of: nominal resistance=300 Ω(+/−20%); maximum continuous voltage (rms)=265 V, maximum current without tripping (25° C.)=39 mA; minimum trip current (25° C. ambient)=55 mA; switch temperature=120° C. Of course, other types of PTC devices 214 may be used, as will be contemplated by those of ordinary skill in the art.

Figure 3A:
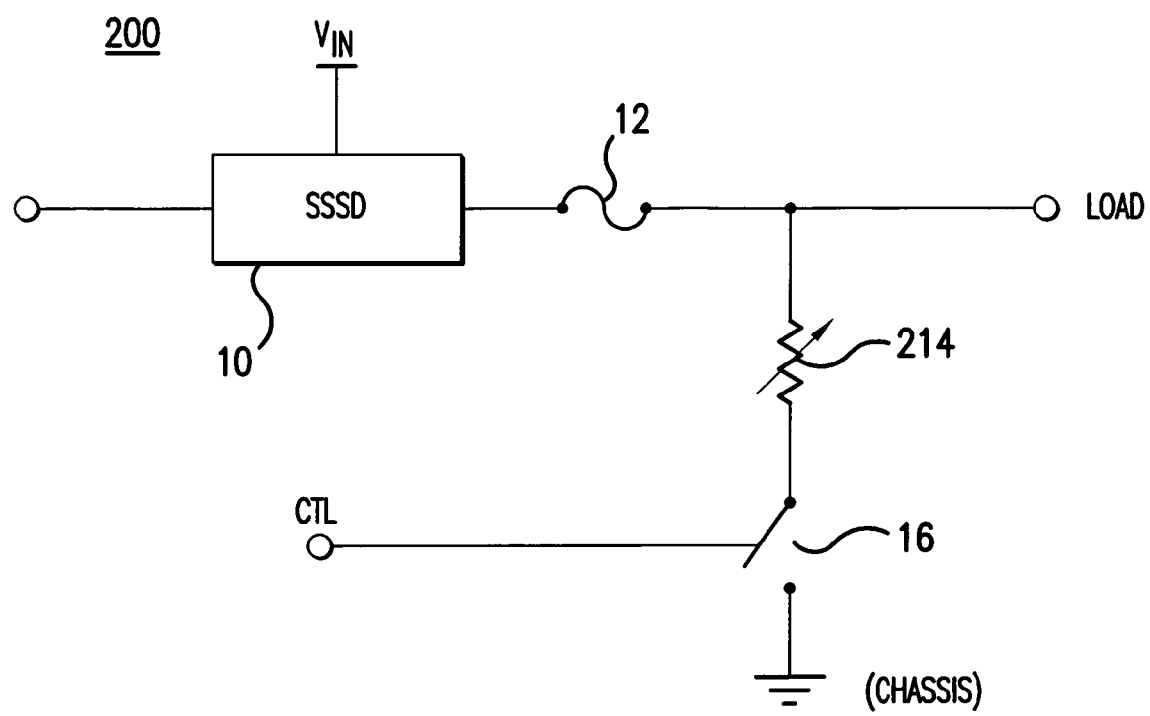
FIG. 3A illustrates the use of a positive thermal coefficient (PTC) device as a shunt impedance component.

The embodiment of FIG. 3A may be particularly suited for the application-specific considerations described above in connection with aircraft. In particular, the switch temperature $T_S$ characteristic of the PTC 214 provides a protective function against certain types of fault conditions.

Figure 3B:
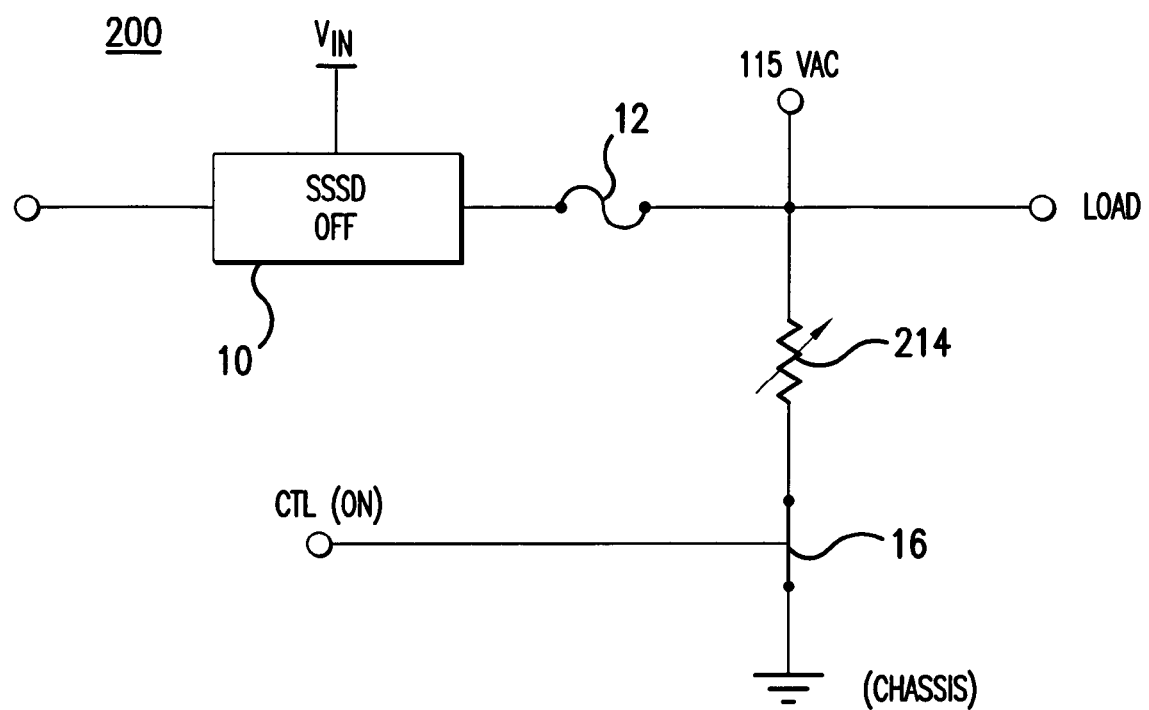
FIG. 3B illustrates a fault condition invoking protective functionality of the PTC device, according to exemplary embodiments of the present invention.

For instance, FIG. 3B illustrates one such fault condition, in which a high level of voltage, e.g., 115 V(rms), is applied to the PTC 214 while the shunt switching element 16 is turned on. The resultant current flow (reaching up to ~385 mA) will cause the PTC device 214 to heat up to the $T_S$ level, which in turn causes the PTC device 214 to trip. Accordingly, the PTC device 214 transforms to a high-resistance element, curtailing current flow and preventing excessive heat dissipation. Once the fault is removed, the PTC device 214 resumes normal operation.

The situation of FIG. 3B might arise when an "OFF" SSPC channel becomes connected by faulty operation to an adjacent "ON" SSPC channel. Alternatively, this situation might arise if the SSPC controller fails to trigger the SSSD 10 to turn off at the appropriate time, thereby resulting in an "ON" SSSD 10 in combination with an "ON" shunt switching element 16. As discussed above, the use of PTC device 214 helps prevent permanent damage in such circumstances.

In addition to dealing with fault connections, most ceramic PTC devices can withstand a strike of lightning, thus making them further suitable for aircraft applications.

For any of the embodiments shown in FIGS. 2A, 2B and 3A, the impedance value of $Z_{SHUNT}$ for the resistor 114A, capacitor 114B, or PTC device 214 may be determined according to a simulation method (e.g., computer simulation), as will be described in more detail below in connection with FIGS. 8 and 9. In an exemplary embodiment, such simulation may be used for determining the appropriate value of $Z_{SHUNT}$ for limiting leakage current to a level of approximately 0.5 mA.

Figure 6:
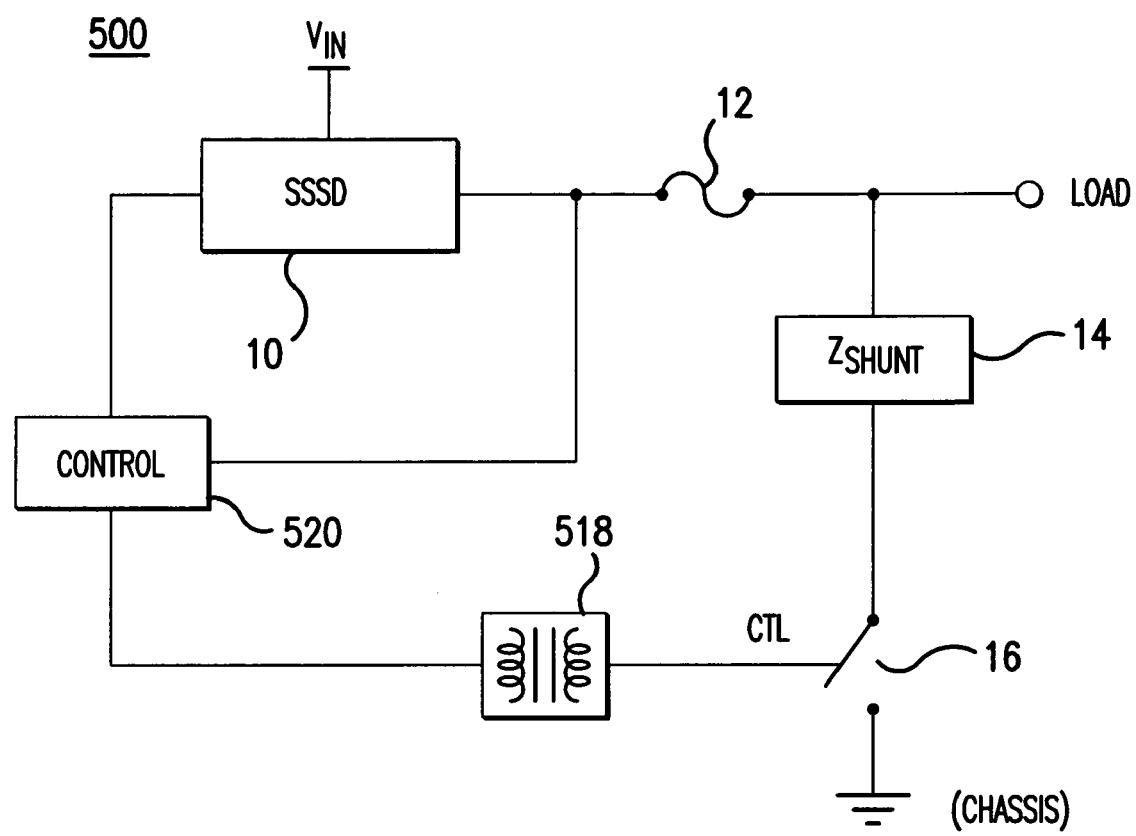
FIG. 6 illustrates a control device for controlling a shunt switching element, according to an exemplary embodiment of the present invention.

FIG. 6 illustrates an embodiment where the circuit arrangement 500 includes a control device 520 to control the operation of the shunt switching element 16. In this embodiment, the shunt switching device 16 may comprise any type of switch that is electrically isolated from the SSSD 10. For example, in this figure, the control device 520 is connected to an electrical isolation device 518, which in turn generates the CTRL signal for the shunt switching element 16.

It should be noted that the control device 520 illustrated FIG. 6 is generic to two different techniques for controlling the shunt switching element 16. According to one technique, the control device 520 regulating the ON and OFF switching of the shunt switching element 16 also controls the ON and OFF power switching state of the SSSD 10. According to the other technique, the control device 520 senses the output of the SSSD 10 in order to detect the switching state of the SSSD 10 and control the shunt switching element 16 accordingly.

Figure 4A:
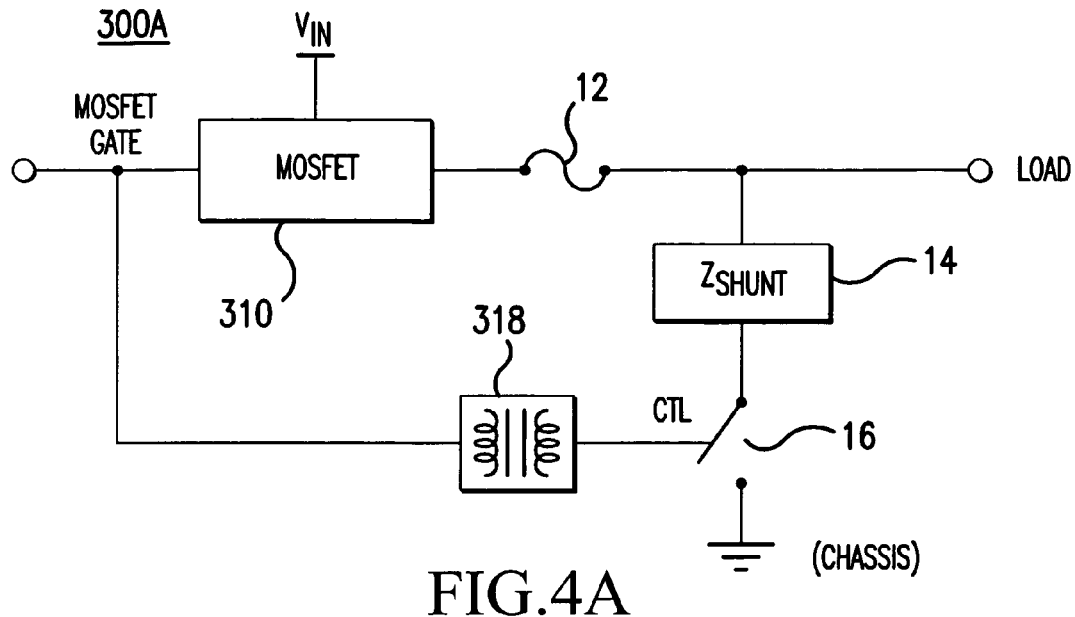
FIGS. 4A and 4B illustrate alternative configurations of shunt circuitry for an electrical power distribution system utilizing a power MOSFET, according to exemplary embodiments of the present invention.
Figure 4B:
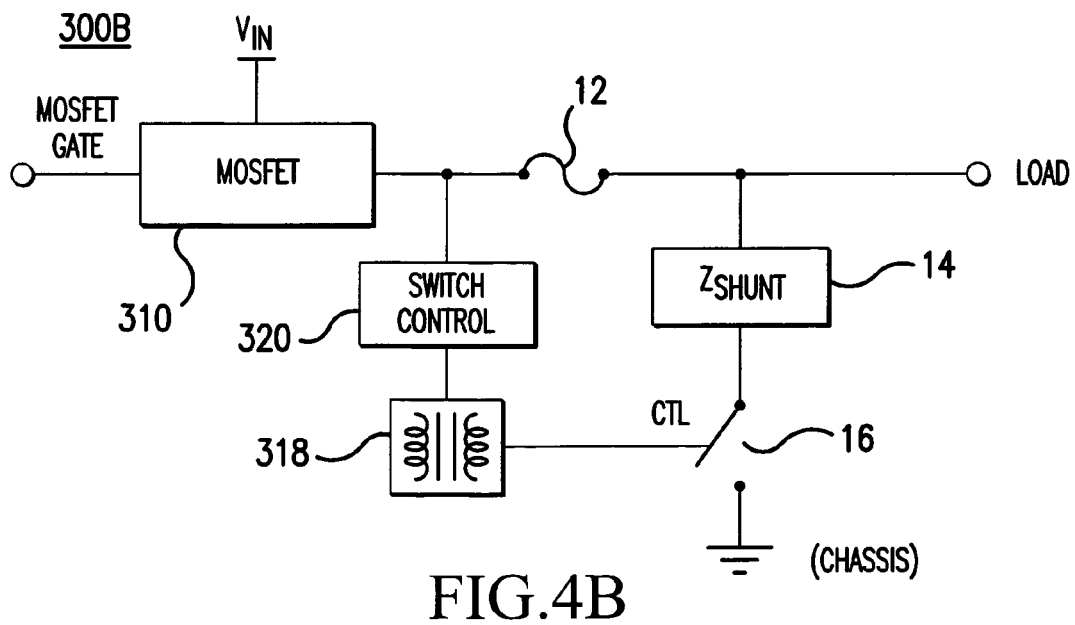

Furthermore, these techniques may be implemented in a circuit in which the SSSD 10 comprises a power MOSFET 310, as illustrated in FIGS. 4A and 4B, respectively. For purposes of convenience, the control devices have been omitted from these figures.

FIG. 4A shows a circuit arrangement 300A in which the same signal controlling the power switching function of MOSFET 310 also controls the ON/OFF state of shunt switching element 16. In circuit 300A, the power MOSFET 310 is turned on and off by applying the appropriate drive signal to the MOSFET gate. As shown in FIG. 4A, the gate drive signal is also applied to the shunt switching device 16, e.g., via electrical isolation circuit 318. Based on the gate drive signal, the CTRL signal may be generated for selectively turning the shunt switching element 16 on and off.

On the other hand, FIG. 4B illustrates a circuit arrangement 300B in which the shunt switching element 16 is turned on and off based on a sensed output of the power MOSFET 310. In this figure, block 320 represents a switch control operation, which is performed by a control device (not shown), for sensing the switching state of MOSFET 310 and generating an appropriate control signal to be sent to the shunt switching element 16, e.g., via electrical isolation device 318. Accordingly, an appropriate CTRL signal is sent to the shunt switching element 16.

Referring again to FIG. 6, it is further contemplated that the circuit arrangement 500 may be employed in a manner that combines the aforementioned techniques for controlling shunt switching element 16. For instance, the control device 520 may be used to perform ON/OFF switching for both the SSSD 10 and the shunt switching element 16. However, as a fail-safe mechanism, the control device 520 may further sense the switching state of SSSD 10 to ensure that the SSSD 10 has been triggered OFF at the appropriate times. This helps prevent fault situations from occurring where both the SSSD 10 and shunt switching elements are OFF.

Figure 5:
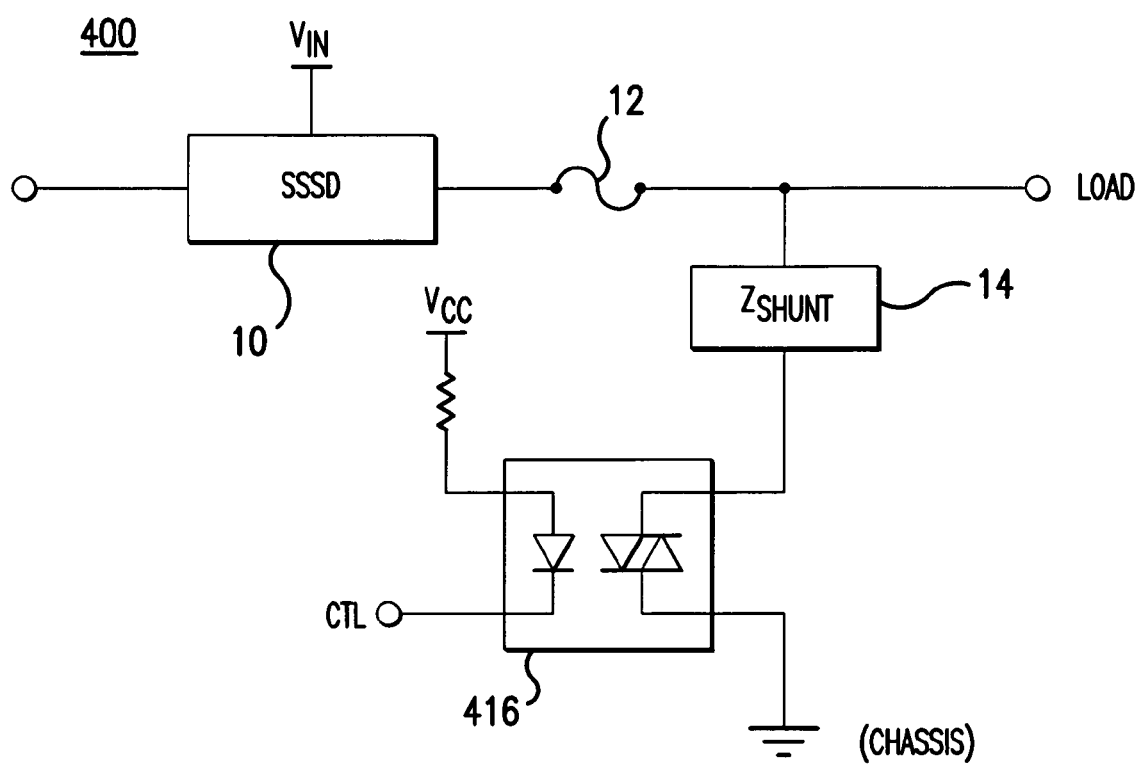
FIG. 5 illustrates a shunt switching element utilizing an opto-triac, according to an exemplary embodiment of the present invention.

Various means for electrically isolating the shunt switching element 16 from the MOSFET 310 (or other SSSD) will be readily apparent to those of ordinary skill in the art. For instance, the shunt switching element 16 itself may provide the necessary isolation. For instance, the choice of an opto-triac 416 as shunt switching element, as illustrated in FIG. 5, may provide the necessary isolation.

FIGS. 7A and 7B illustrate exemplary embodiments in which a power MOSFET 310, opto-triac 416, and PTC 214 are implemented to perform the functions of the SSSD, shunt switching element, and shunt impedance component, respectively. In particular, circuit arrangement 600A of FIG. 7A corresponds to the control technique and circuit configuration described above in connection with FIG. 4A. On the other hand, circuit arrangement 600B corresponds to the control technique and circuit configuration described above in connection with FIG. 4B.

In addition to being able to survive other fault conditions described above, the leakage shunt circuitry of FIG. 7A or 7B may be designed to withstand the occurrence of lightning when the opto-triac 416 is ON or OFF. Generally, in an aircraft SEPDS, the design specifications include a maximum transient voltage that the leakage shunt circuitry (including the shunt switching element) should be able to withstand, e.g., due to a lightning strike. For instance, the maximum transient voltage may be set to 800 V for the circuitry of FIG. 7A or 7B. Thus, a transorb (not shown) may be implemented in the SEPDS to clamp the lightning to 800 V. Thus, if lightning occurs while the opto-triac 416 is ON, the 800 V drops on the PTC device 214. Assuming the PTC device 214 has a nominal resistance of 300 Ω, the transient current flowing through the opto-triac 416 will be ~2.67 A. An opto-triac 416 such as the IL4218-X009 can withstand 3 A transient current per specification. On the other hand, if the lightning occurs when opto-triac 416 is OFF, the 800V lightning (after clamping) drops on the opto-triac 416. Per specification, an opto-triac 416 such as the IL4218-X009 can withstand 800V.

Simulation of Leakage Current and Shunt Circuitry

Description will now be made of embodiments involving the use of simulation to set the parameters and verify the operation of leakage shunt circuitry in accordance with the present invention. For example, simulation of the leakage shunt circuitry may be performed on a general purpose computer using various types of circuit simulation programs.

According to an exemplary embodiment, such simulation may be performed to help ensure that the leakage shunt circuitry satisfies the safety conditions discussed above. The simulation may also be used to verify that the leakage shunt circuitry is suitable based on the application-specific considerations described above. In other words, the simulation may verify that the circuitry can withstand the special situations involved in aircraft-specific applications.

In order to test these conditions, it would be useful to have an electrical circuit model of the human body to assess the level of electrical hazard posed by the leakage current. FIG. 8 illustrates an RC circuit model of the human body, according to the IEC 60990. This RC model includes terminals A and B representing contact with an electrical conductor. The model also includes a parallel combination of resistor $R_S$ and capacitor $C_S$ to represent the skin impedance, and a resistor $R_{INT}$ to represent the internal body resistance. The values of these components can be estimated as $R_S$=1.5 Ω, $C_S$=220 nF, and $R_{INT}$=500 Ω. Further, components R1 and C1 represent the output load of the SSPC. Accordingly, the level of leakage current passing through the human body is determined as $U_{C_1}/500$, where $U_{C_1}$ is the voltage across C1.

Figure 8:
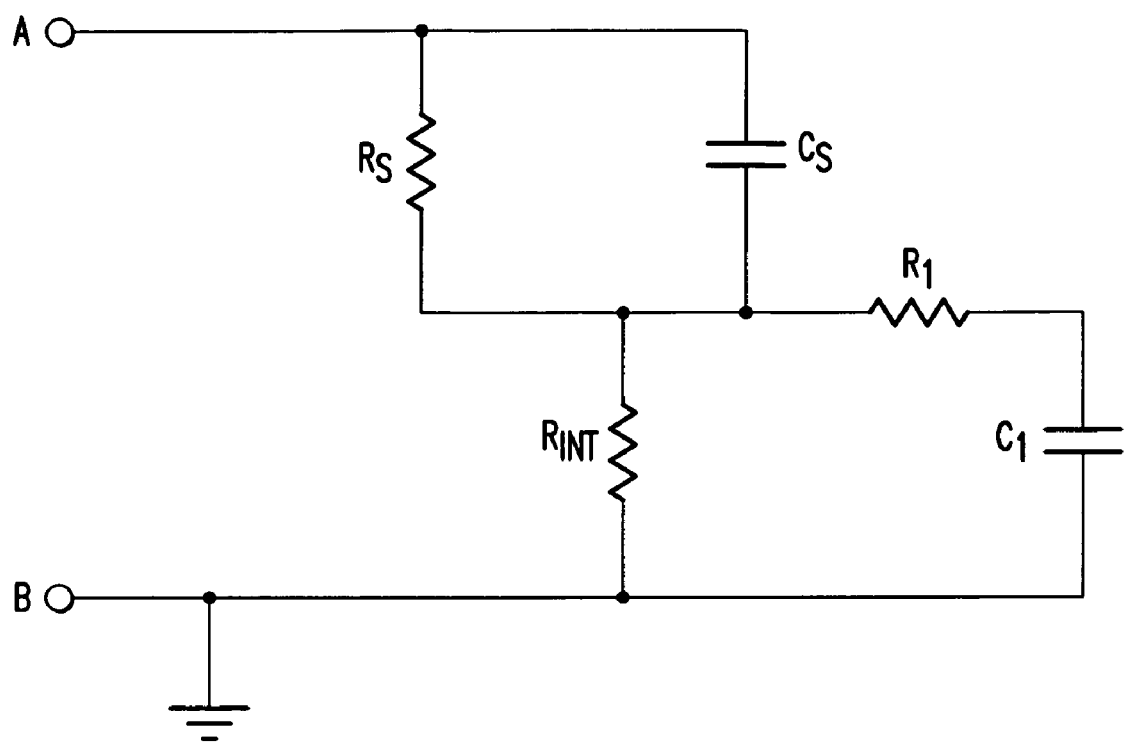
FIG. 8 is a schematic diagram of an RC circuit model of the human body for assessing a level of electrical hazard posed by a leakage current level.
Figure 9:
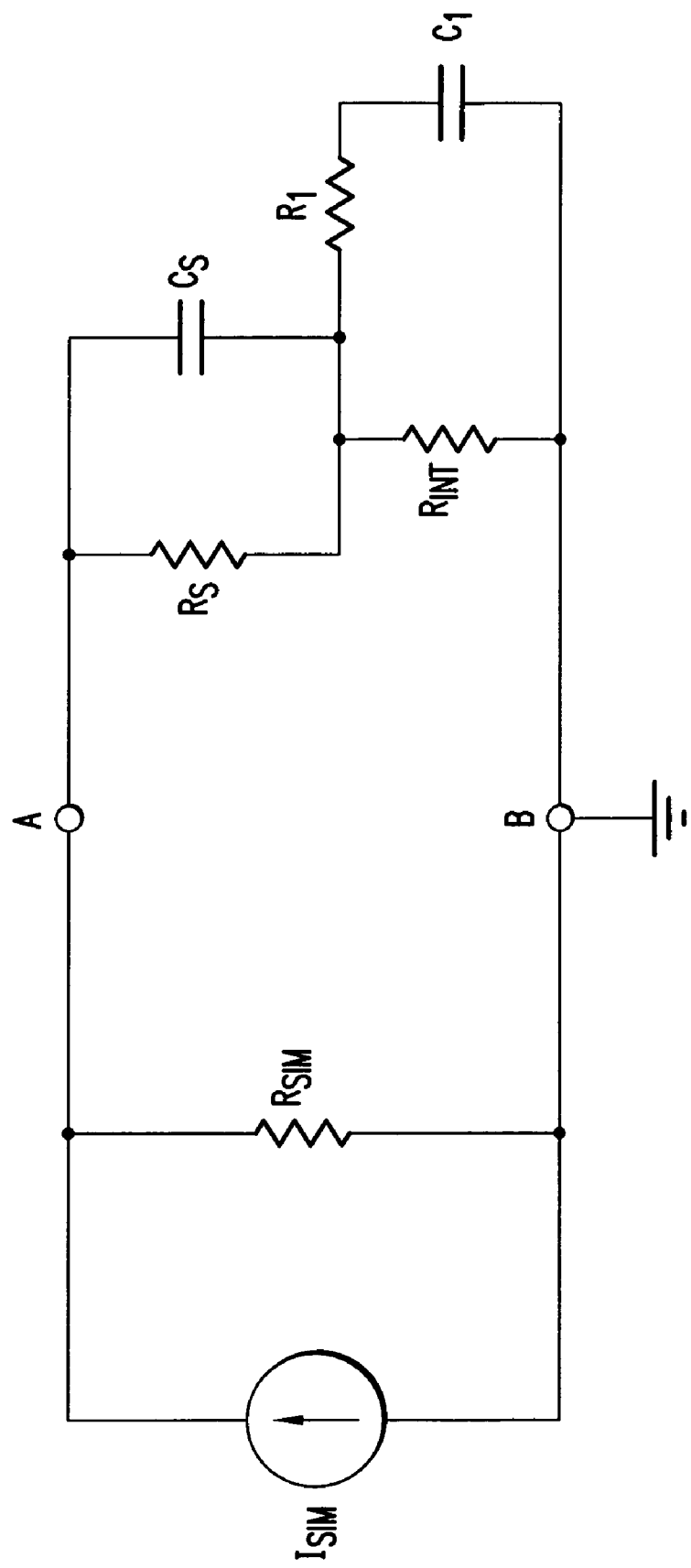
FIG. 9 is a schematic diagram of a circuit configuration for a leakage current simulation used for designing and/or verifying component values, according to an exemplary embodiment of the present invention.

Using the RC model illustrated in FIG. 8, a circuit configuration may be created on which leakage current simulation is to be performed. FIG. 9 illustrates such a circuit configuration. In FIG. 9, the leakage current of the SSSD 10 is represented by $I_{SIM}$, and the shunt impedance (i.e., $Z_{SHUNT}$ in FIG. 1) is represented by $R_{SIM}$. Thus, using this simulation, the appropriate value of $R_{SIM}$ may be determined for limiting the leakage current ($U_{C_1}/500$) flowing through the human body. Also, this simulation may be used to verify the operation of the shunt impedance during various fault conditions, e.g., by ensuring that the current passing through $R_{SIM}$ remains at tolerable levels under various situations.

The simulation may be performed according to application-specific conditions. Consider an exemplary aircraft SEPDC application in which a MOSFET is used as a high-power solid state relay. This type of MOSFET relay has a 4 mA leakage current at 800 Hz. Based on this specific case, a simulation according to FIG. 9 may be used for determining a shunt resistance for clamping the leakage current to a safe level. For example, after plugging in the aforementioned component values, this simulation shows that a shunt resistance ($R_{SIM}$) of 400 Ω is sufficient to shunt the leakage current passing the human body to be less than 0.5 mA (while lower values of the shunt resistance would result in even less leakage current through the human body).

The above simulation results may be applied to the exemplary leakage shunt circuitry of FIG. 7A or 7B to verify its operation in an aircraft SEPDS system. Assuming the PTC device 214 has a with nominal resistance 300 Ω (+/−20%) and switching temperature of 120° C. (e.g., ceramic PTC YM12045X301), the circuitry meets the requirements for current and temperature levels for which an operator can work on it without adverse reaction, per IEC 60990.

Although specific implementation parameters and applications have been described above, it should be recognized that principles of the present invention may be realized in different environments/applications with different implementation parameters. For instance, exemplary embodiments have been described above as implementing specific components to meet exemplary design parameters. However, it should be stressed that the present invention is not limited to the use of any particular component, any set of design parameters, or any specific environment.

We claim:

1. An apparatus for shunting leakage current in an electrical power distribution system, the system utilizing a solid state switching device to perform power switching functions for an output load, the apparatus comprising:

a switchable shunt configured to selectively provide a pathway to divert electrical leakage current away from the output load of the electrical power distribution system toward ground in accordance with the power switching functions performed by the solid state switching device, wherein the switchable shunt comprises:

a resistor or capacitor connected to an output of the solid state switching device, with the resistor or capacitor selected in order to limit leakage current flowing to the output load to no more than 0.5 mAmps, when the solid state switching device is turned off; and a shunt switching element configured to:

connect the resistor or capacitor to ground when the solid state switching device is turned off, and disconnect the shunt impedance component from ground when the solid state switching device is turned on.

2. The apparatus of claim 1, wherein the solid state switching device is a power MOSFET.

3. The apparatus of claim 1, wherein the shunt switching element is configured to withstand a maximum transient voltage depending on the environment of the electrical power distribution system.

4. The apparatus of claim 1, wherein the shunt switching element comprises an optical-triac.

5. The apparatus of claim 1 wherein control of the shunt switching element is electrically isolated from the solid state switching device.

6. The apparatus of claim 5, further comprising a power switching controller configured to
generate a control signal that selectively turns the solid state switching device on and off in order to perform an appropriate power switching function for the output load, and
control the shunt switching element to turn on or off based on the control signal.

7. The apparatus of claim 6, wherein the solid state switching device is a power MOSFET, and the control signal is commonly used for driving the gate of the power MOSFET and for selectively turning the shunt switching element on and off.

8. The apparatus of claim 5, further comprising a switch controller configured to:
sense an output of the solid state switching device and determine whether the solid state switching element is turned off based on the sensed output; and
turn the shunt switching element on when the solid state switching device is turned off.

9. The apparatus of claim 1, wherein the resistor is a positive thermal coefficient (PTC) device.

10. The apparatus of claim 9, wherein
the PTC device has a nominal resistance value suitable for limiting the leakage current flowing to the output load to no more than 0.5 mAmps when the solid state switching device is turned off, and
the PTC device has a switching temperature suitable for causing the PTC device to trip when a certain level of voltage is applied to the output load while the shunt switching element is turned on.

11. The apparatus of claim 10, wherein the shunt switching element comprises an opto-triac, the shunt switching element being configured to withstand an applied voltage level of substantially 800 V.

12. The apparatus of claim 11, the apparatus being configured for implementation in a secondary electrical power distribution system (SEPDS) of an aircraft, the ground being a chassis in the aircraft.

13. An apparatus for shunting leakage current in a secondary electrical power distribution system (SEPDS) of an aircraft, the SEPDS utilizing a power MOSFET to perform power switching functions for an output load, the apparatus comprising:
a potential positive thermal coefficient (PTC) device connected to an output of the solid state switching device;
an opto-triac switch configured to:
connect the PTC device to ground when the power MOSFET is turned off, and
disconnect the PTC device from ground when the power MOSFET is turned on,
wherein the PTC device has a nominal resistance value suitable for limiting the leakage current flowing to the output load to no more than 0.5 mAmps when the power MOSFET is turned off, and
the opto-triac switch is controlled in accordance with at least one of the following: a signal driving the gate of the power MOSFET, and a sensed output of the power MOSFET.

* * * * *